(12) United States Patent
McGhie

(10) Patent No.: US 6,942,232 B1
(45) Date of Patent: Sep. 13, 2005

(54) SUSPENSION SYSTEM FOR A TRANSPORT VEHICLE

(75) Inventor: James R. McGhie, Henderson, NV (US)

(73) Assignee: American Heavy Moving & Rigging Inc., Chino, CA (US)

( * ) Notice: Subject to any disclaimer, the term of this patent is extended or adjusted under 35 U.S.C. 154(b) by 274 days.

(21) Appl. No.: 10/443,550

(22) Filed: May 22, 2003

Related U.S. Application Data

(60) Provisional application No. 60/383,554, filed on May 24, 2002.

(51) Int. Cl.[7] .............................. B60G 9/02; B60G 5/04

(52) U.S. Cl. ...................... 280/124.112; 280/124.114; 280/124.111; 280/124.116; 280/124.117

(58) Field of Search ................. 280/124.112, 124.111, 280/124.114, 124.116, 124.117

(56) References Cited

U.S. PATENT DOCUMENTS

| | | | | |
|---|---|---|---|---|
| 3,420,543 A | * | 1/1969 | Scarpatetti et al. | ... 280/124.116 |
| 3,582,104 A | * | 6/1971 | Eggert, Jr. | ................ 280/80.1 |
| 4,441,730 A | * | 4/1984 | Damm | ........................ 280/426 |
| 4,943,078 A | * | 7/1990 | McGhie et al. | ............. 280/408 |
| 5,997,013 A | * | 12/1999 | Claxton | ................... 280/6.154 |
| 6,012,724 A | * | 1/2000 | Pitkanen | .................. 280/6.155 |
| 6,371,505 B1 | * | 4/2002 | Turner, II | ................ 280/441.2 |

* cited by examiner

*Primary Examiner*—Paul N. Dickson
*Assistant Examiner*—George D. Spisich
(74) *Attorney, Agent, or Firm*—Timothy Thut Tyson; Ted Masters; Freilich, Hornbaker & Rosen

(57) ABSTRACT

A suspension system for a multi-axle transport vehicle for moving heavy loads includes two fluid activated cylinders and two spaced apart arms for each wheel and axle set which allow the transport vehicle to be raised and lowered with respect to the roadway. The suspension system mechanically stabilizes the axles with respect to the transport vehicle thereby reducing axle yaw and allowing higher transport speeds.

2 Claims, 9 Drawing Sheets

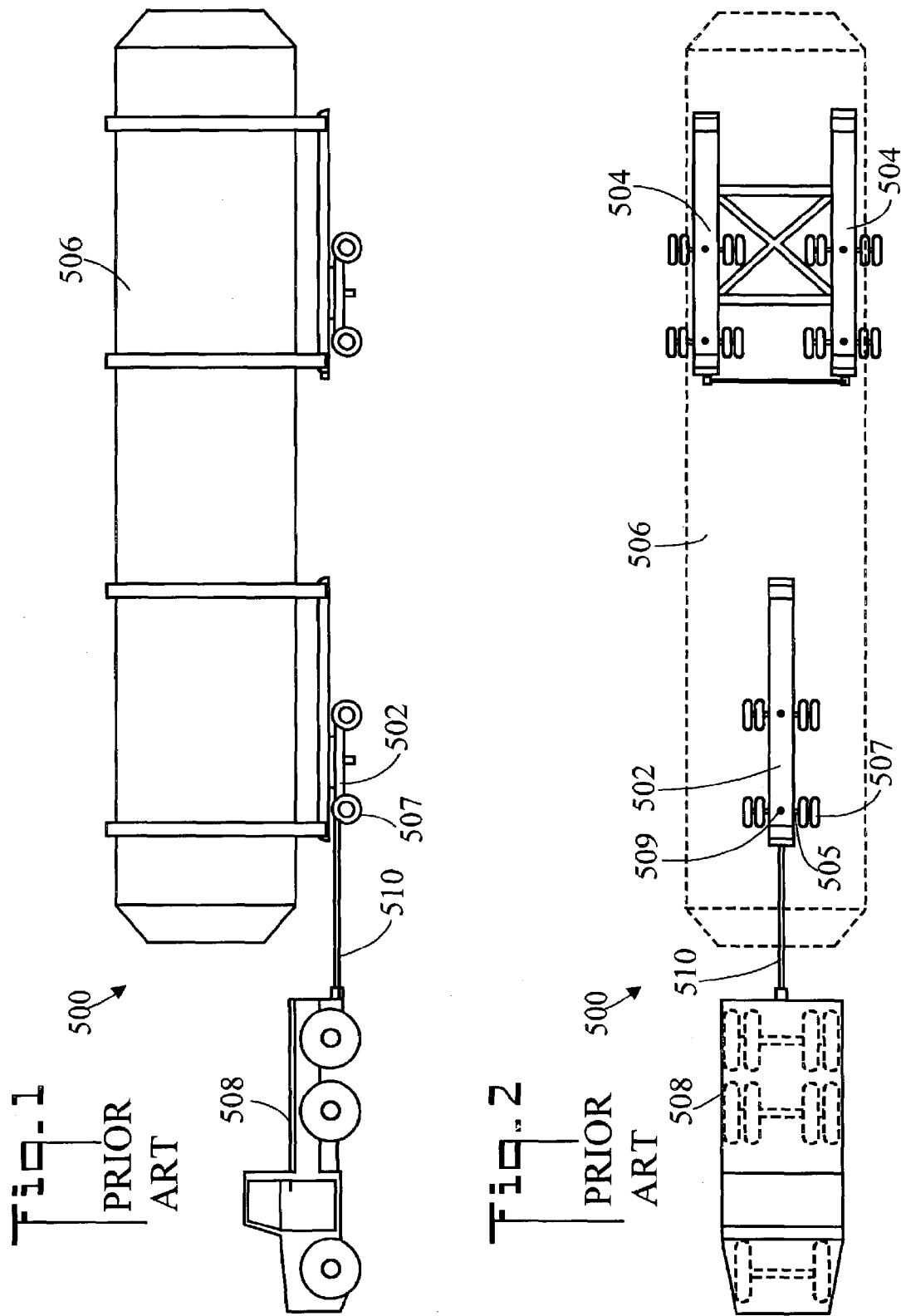

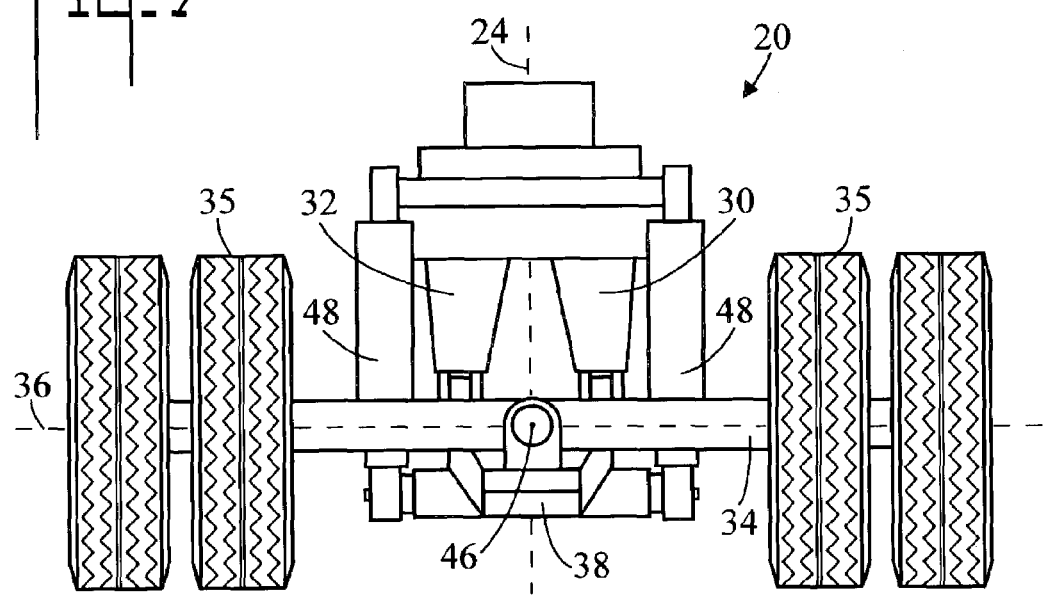
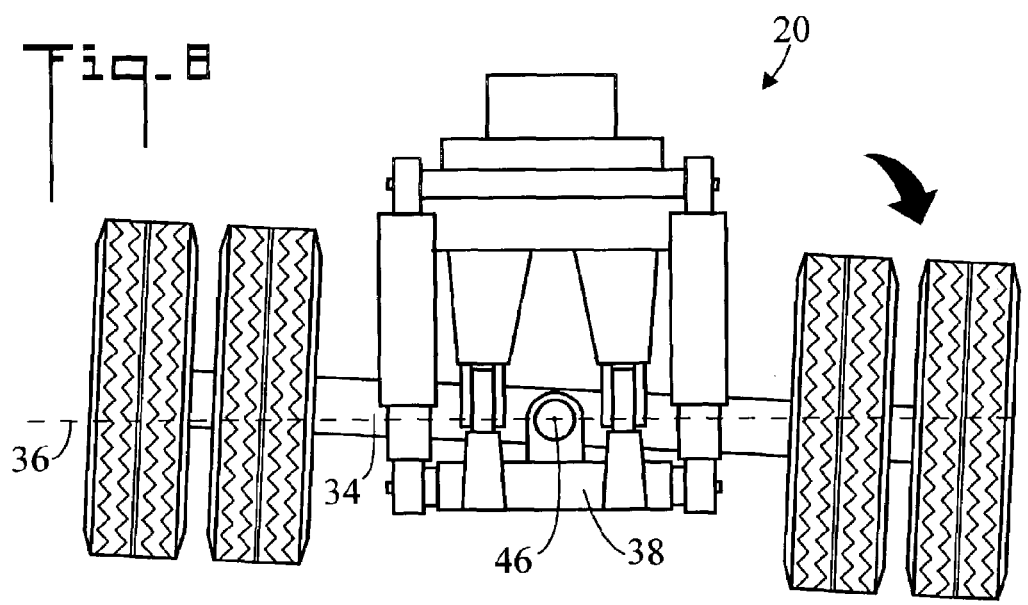

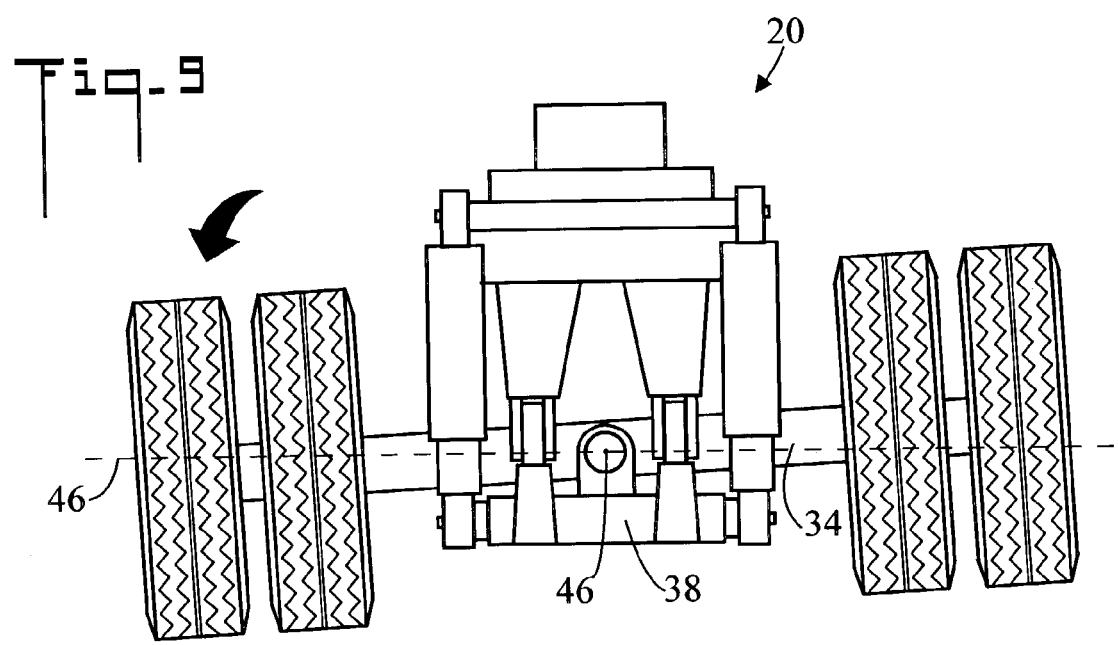

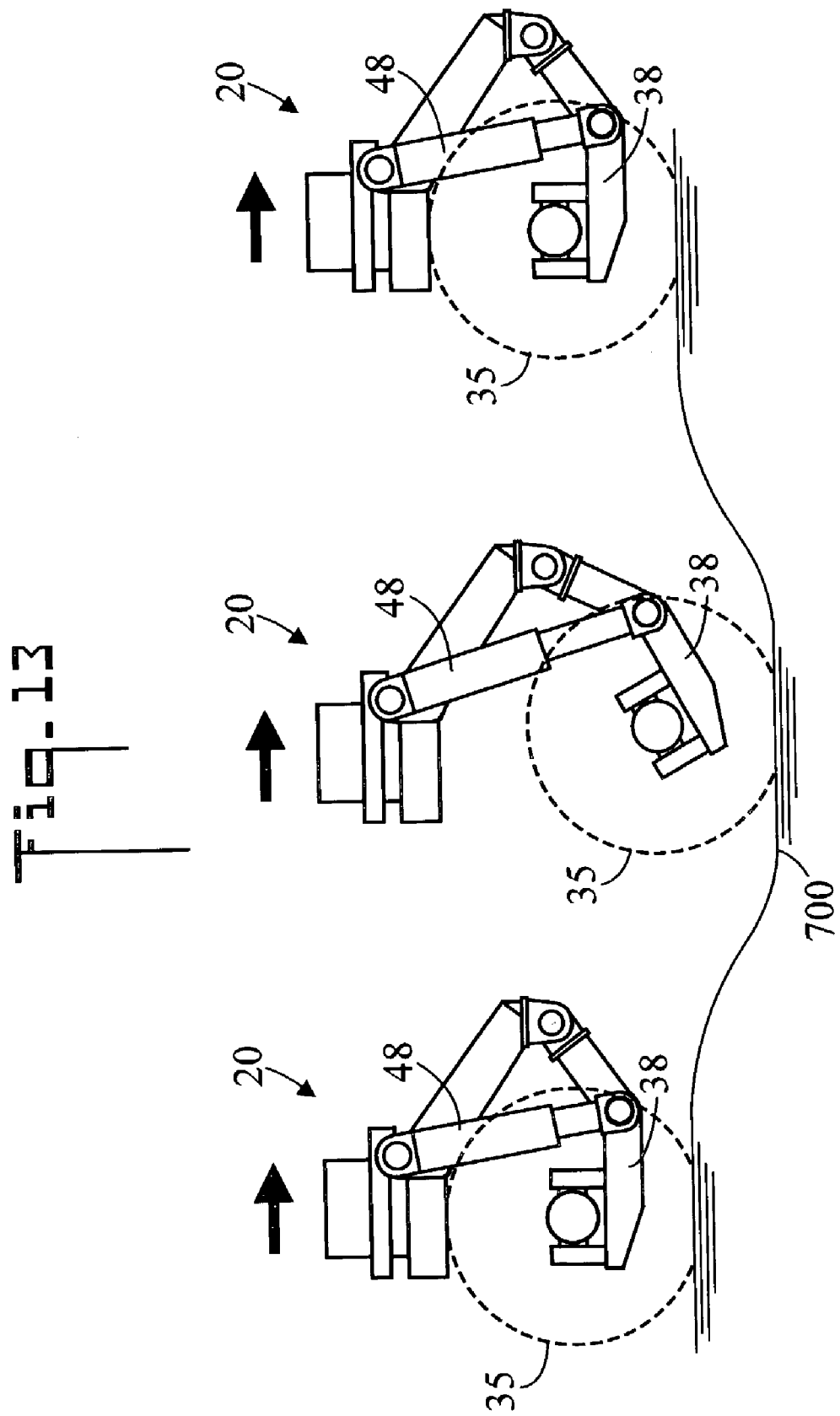

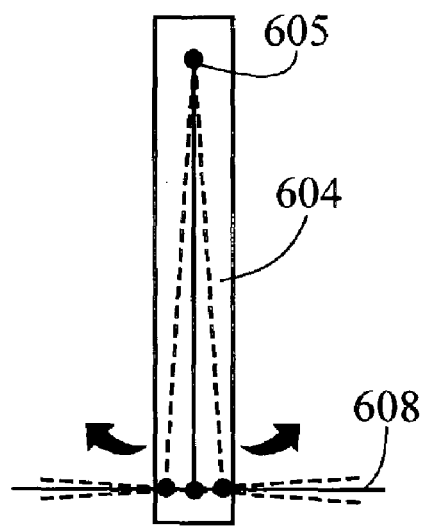
Fig_15
PRIOR ART
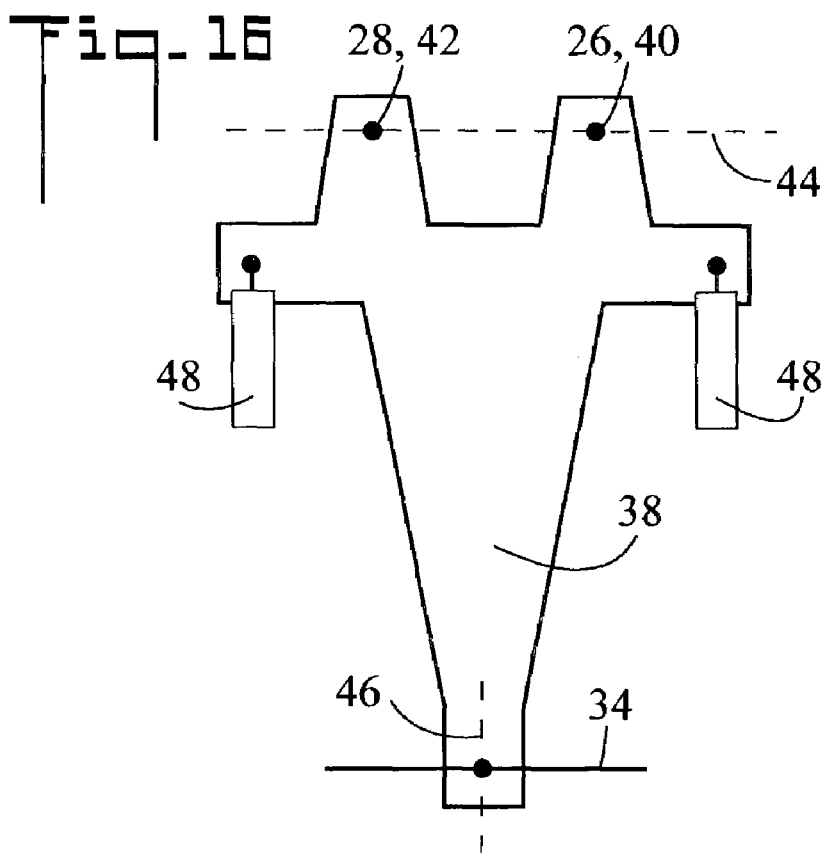
Fig_16

SUSPENSION SYSTEM FOR A TRANSPORT VEHICLE

CROSS REFERENCE TO RELATED APPLICATION

This application claims the filing benefit under 35 U.S.C. § 119(e) of U.S. Provisional Application No. 60/383,554, filed May 24, 2002, which is included herein by reference.

TECHNICAL FIELD

The present invention pertains generally to multi-axle transport vehicles for moving heavy loads, and more particularly to a suspension system for such vehicles.

BACKGROUND OF THE INVENTION

Heavy hauling vehicles for moving transformers, cranes, boats, industrial equipment, and other heavy objects are well known in the art. An example of such a vehicle is given in U.S. Pat. No. 4,943,078 which discloses a heavy load hauler for traveling on conventional roadways for moving heavy construction equipment such as cranes or the like from one work site to another. The hauler includes a front tractor drawn carriage, a rear carriage, and a load unit disposed between and carried by the carriages. The front carriage is supported upon a multiplicity of independent wheel and axle units. There is a first fifth wheel coupling at the leading end of the front carriage for connecting to the fifth wheel coupling of a tractor. A second fifth wheel coupling is spaced rearwardly. The load carrying rear carriage is also supported upon a multiplicity of independent wheel and axle units. There is a fifth wheel coupling intermediate the leading and trailing ends of the carriage. The load unit has forwardly and rearwardly projecting goosenecks. Each gooseneck has a fifth wheel coupling. The one on the forwardly projecting gooseneck connects to the fifth wheel coupling on the front carriage. The one on the rearwardly projecting gooseneck connects to the fifth wheel coupling on the rear carriage. The load unit may be either the crane itself or a flatbed upon which the crane is carried. At least some of the independent wheel and axle units are steerably mounted on their carriages. Each wheel and axle unit has its wheels supported by a hydraulic suspension. Hydraulic circuitry interconnects all of the suspensions so as to equally distribute the load among all of the wheel units. Steering of the independent wheel and axle units is interphased for the front and rear carriages by a pair of operatively associated interrelated inline valve cylinder units. FIG. 12A shows a valve 718 used in a power steering system which is coupled to a connecting link 703.

Other heavy hauling vehicles are sold by Goldhofer Fahrzeugwerk G.m.b.H. of Memmingen, Germany; Nicolas of Champs Sur Yonne, France; and Talbert of Rensselaer, Ind.

Improved systems having automatic steering at all speeds and suspension systems that respond rapidly to the varying road conditions imposed by higher speeds would greatly reduce the time and effort required to move the vehicle to the load, move the load, and return the vehicle to storage.

SUMMARY OF THE INVENTION

The present invention is directed to a suspension system for a heavy load transport vehicles which tends to resist axle yaw. The body of the suspension system is connected to the axle by an axle linkage member which is connected to the body at four different pivotal locations. This four-point connection stabilizes the axle linkage member and substantially reduces any tendency to yaw when exposed to road induced forces. The suspension system employs two fluid activated cylinders rather than the conventional one cylinder. This feature allows the use of smaller diameter cylinders for a given system pressure. The cylinders are mounted on the outside of the suspension system for ease of maintenance.

In accordance with a preferred of the invention, a suspension system for a transport vehicle includes a body which is pivotable about a first axis, the body has a first attachment station separate and spaced apart from a second attachment station. An axle is disposable along a second axis which is perpendicular to the first axis. An axle linkage member has a third attachment station which is spaced apart from a fourth attachment station, the third attachment station of the axle linkage member is pivotally connected to the first attachment station of the body, and the fourth attachment station of the axle linkage member is pivotally connected to the second attachment station of the body. The axle linkage member is pivotable about a third axis which is parallel to the second axis. The axle is pivotally connected to the axle linkage member; the axle is pivotable about a fourth axis perpendicular to the first, second and third axes. Two separate and spaced apart fluid activated cylinders are pivotally connected between the body and the axle linkage member, wherein the two fluid activated cylinders are disposed outside of the first, second, third, and fourth attachment stations. When the two fluid activated cylinders are extended, the axle linkage member pivots away from the body. When the two fluid activated cylinders are retracted, the axle linkage member pivots toward the body.

In accordance with an aspect of the invention, when the transport vehicle is traveling on a road, the connection of the first attachment station to the third attachment station, the connection of the second attachment station to the fourth attachment station, and the connection of the two fluid activated cylinders between the body and the axle linkage member combine to reduce yaw of the axle.

Other aspects of the present invention will become apparent from the following detailed description, taken in conjunction with the accompanying drawings, which illustrate, by way of example, the principles of the invention.

BRIEF DESCRIPTION OF THE DRAWINGS

FIG. 1 is a side elevation view of a prior art multi-axle transport vehicle for moving heavy loads;

FIG. 2 is a top plan view of the vehicle of FIG. 1;

FIG. 7 is a rear elevation view of the suspension system;

FIG. 8 is a front elevation view of the suspension system with an axle rotated in a clockwise direction;

FIG. 9 is a front elevation view of the suspension system with the axle rotated in a counterclockwise direction;

FIG. 13 is a side elevation view of the suspension system when the tires encounter a pothole;

FIG. 15 is a simplified bottom plan view of a prior art axle linkage member; and, FIG. 16 is a simplified bottom plan view of the axle linkage member of the present invention.

DETAILED DESCRIPTION OF THE INVENTION

Figure 3:
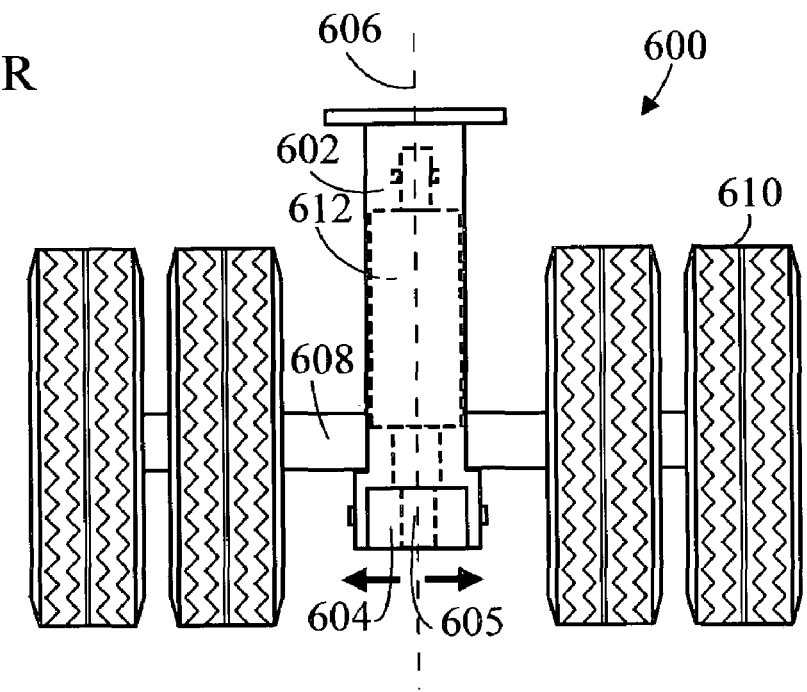
FIG. 3 a front elevation view of a prior art axle suspension system.

FIGS. 1 and 2 illustrate side elevation and top plan views, respectively, of a prior art multi-axle transport vehicle 500 for moving heavy loads. The vehicle 500 has a front dolly 502 and a pair of rear dollies 504 upon which a load 506 rests. The front dolly 502 and rear dollies 504 each have two axles 505 with four tires 507. Axles 505 are rotatable about a vertical pivot axis 509 thereby allowing the axles 505 and tires 507 to turn to the right or left. The axles 507 are connected to the frames of the dollies 502, 504 by a suspension system which controls the vertical movement of the axles 505. A towing vehicle 508 such as a tractor pulls transport vehicle 500 using a tow bar 510.

Figure 4:
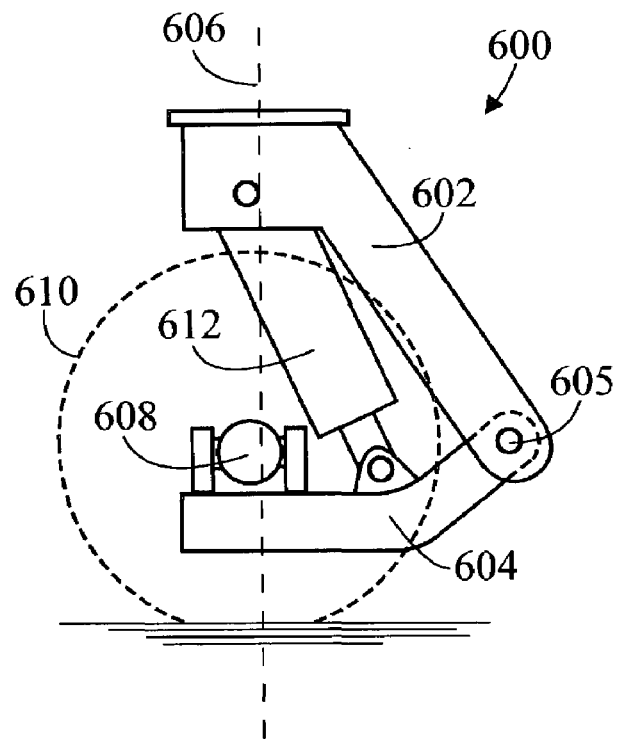
FIG. 4 is a side elevation view of the prior art suspension system.

FIGS. 3 and 4 illustrate front elevation and side elevation views, respectively, of a prior art axle suspension system 600. Suspension system 600 includes an upper body 602 which is pivotally connected to an axle linkage member 604 at point 605. Body 602 is connected to the underside of a dolly and pivots about vertical axis 606 thereby permitting suspension system 600 to turn. An axle 608 and associated tires 610 are connected to axle linkage member 604 thereby permitting axle 608 to roll in response to the road environment (also refer to FIGS. 8 and 9). A single fluid activated cylinder 612 is pivotally connected between body 602 and axle linkage member 604. Fluid activated cylinder 612 usually operates using a combined hydraulic and nitrogen gas system which is well known in the art. When cylinder 612 is extended, axle linkage member 604 pivots away from body 602 raising the top of the dolly further off of the ground (refer to FIG. 12). When cylinder 612 is retracted, axle linkage member 604 pivots toward body 602 lowering the top of the dolly closer to the ground (refer to FIG. 10). In typical operation when the transport vehicle is traveling down a highway, the height of suspension system 600 is set to a mid position by appropriately activating cylinder 612. When the transport vehicle goes over an obstacle such as a large bump or the crest of a hill, suspension system 600 is extended to raise the transport vehicle and thereby prevent possible dragging. Conversely when the transport vehicle goes under an obstruction such as an overpass, suspension system 600 is retracted to lower the transport vehicle and thereby prevent possible collision with the overpass.

Because axle linkage member 604 is connected to body 602 at only one point 605, the stresses encountered during travel can cause axle linkage member 604 and therefore axle 608 to yaw (refer also to FIG. 15 and the discussion pertaining thereto).

Suspension system 600 is typically designed as a split system so that dollies on the right side of the transport vehicle can be raised and lowered independently from dollies on the left side of the vehicle.

Figure 5:
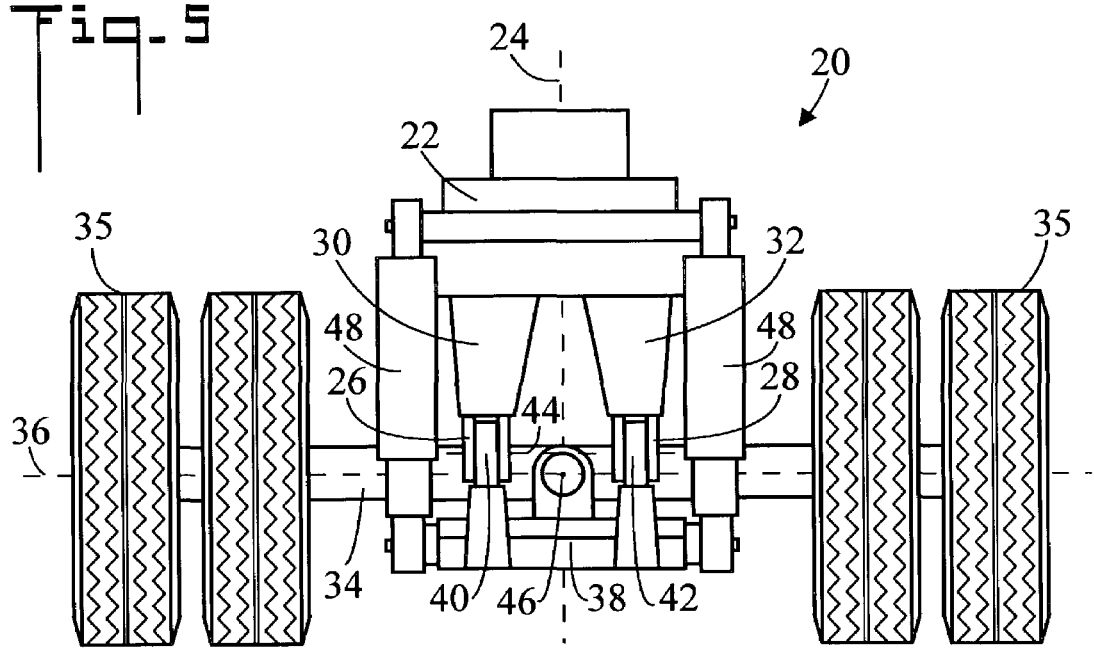
FIG. 5 is a front elevation view of a suspension system in accordance with the present invention.
Figure 6:
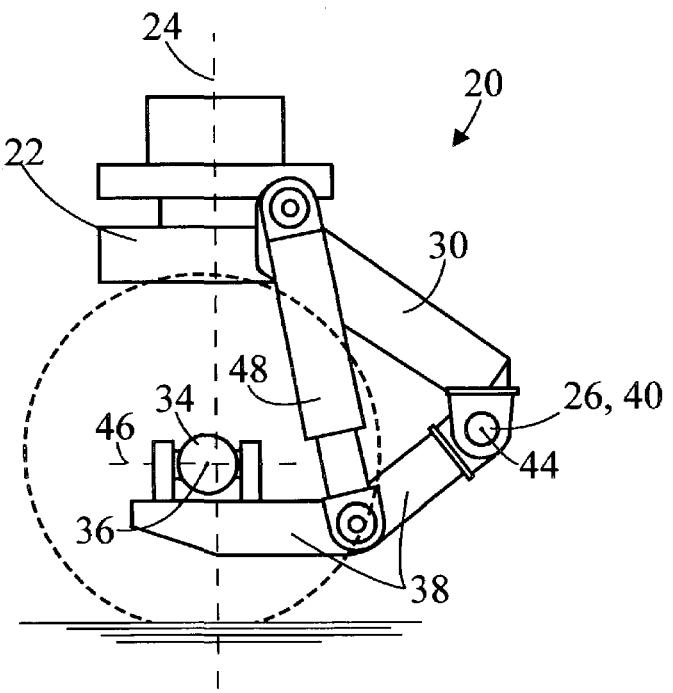
FIG. 6 is a side elevation view of the suspension system.

FIGS. 5–7 illustrate front, side, and rear elevation views, respectively, of a suspension system for a transport vehicle in accordance with the present invention, generally designated as 20. Suspension system 20 includes a body 22 which is pivotable about a first nominally vertical axis 24. Body 22 further includes a first attachment station 26 spaced apart from a second attachment station 28. In the shown embodiment, body 22 includes first arm 30 and second arm 32 having distal ends upon which the first attachment station 26 and second attachment station 28 are respectively disposed.

An axle 34 is disposable along a second axis 36 which is perpendicular to first axis 24. Axle 34 is nominally aligned with second axis 36. However, axle 34 can pivot or roll with respect to second axis 36 as a function of the road surface (also refer to FIGS. 8 and 9). Axle 34 has tires 35 disposed at its two ends.

An axle linkage member 38 has a third attachment station 40 spaced apart from a fourth attachment station 42. Third attachment station 40 of axle linkage member 38 is pivotally connected to first attachment station 26 of body 22, and fourth attachment station 42 of axle linkage member 38 is pivotally connected to second attachment station 28 of body 22. Axle linkage member 38 is pivotable about a third axis 44 which is parallel to second axis 36.

Axle 34 is pivotally connected to axle linkage member 38 and is pivotable about a fourth axis 46 which is perpendicular to first axis 24, second axis 36, and third axis 44 (refer also to FIGS. 8 and 9).

Two spaced apart fluid activated cylinders 48 are pivotally connected between body 22 and axle linkage member 38. The two fluid cylinders 48 are disposed outside of first, second, third, and fourth attachment stations 26, 28, 40, and 42. As defined herein, outside means that cylinders 48 reside closer to tires 35 than the four attachment stations 26, 28, 40, and 42, and that the two cylinders 48 are therefore spaced wider apart than the two pairs of attachment stations.

FIG. 8 is a front elevation view of suspension system 20 with axle 34 rotated about axis 46 in a clockwise direction. FIG. 9 is a front elevation view of suspension system 20 with axle 34 rotated about axis 46 in a counterclockwise direction. Such positions would result from traveling upon an inclined or crowned road surface.

Figure 12:
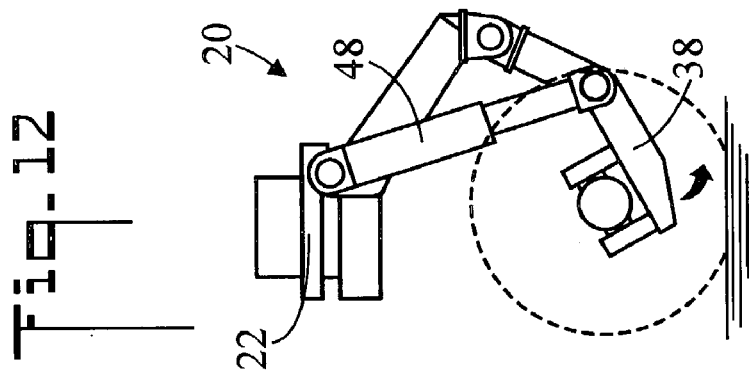
FIG. 12 is a side elevation view of the suspension system in a fully extended position.
Figure 11:
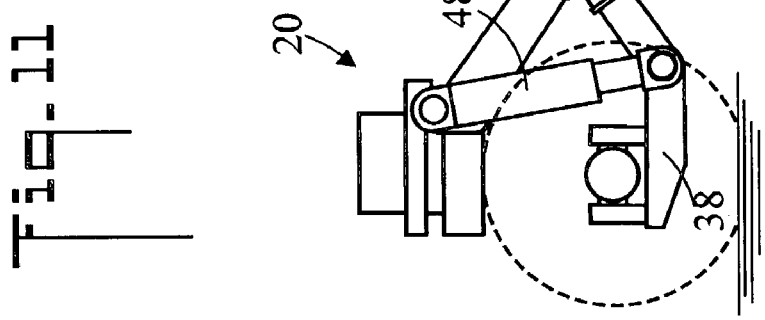
FIG. 11 is a side elevation view of the suspension system in a mid-stroke position.
Figure 10:
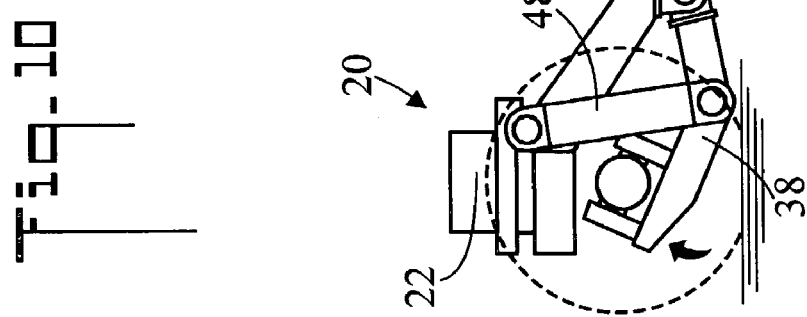
FIG. 10 is a side elevation view of the suspension system in a fully retracted position.

FIGS. 10–12 are side elevation views of suspension system 20 in fully retracted, mid-stroke, and fully extended positions, respectively. In FIG. 10, the two fluid activated cylinders 48 are retracted causing axle linkage member 38 to pivot toward body 22 thereby lowering the transport vehicle. In FIG. 11, the two fluid activated cylinders 48 are in a mid-stroke position such as would be useful in traveling down a road under nominal conditions. In FIG. 12, the two fluid activated cylinders 48 are extended causing axle linkage member 38 to pivot away from body 22 thereby raising the transport vehicle.

FIG. 13 is a side elevation view of suspension system 20 traveling along a road. When the tires 35 encounter a pothole 700, suspension system 20 automatically extends from a mid-stroke position on the left side to an extended position in the middle, and returns to a mid-stroke position on the right side thereby cushioning the ride of the transport vehicle.

Figure 14:
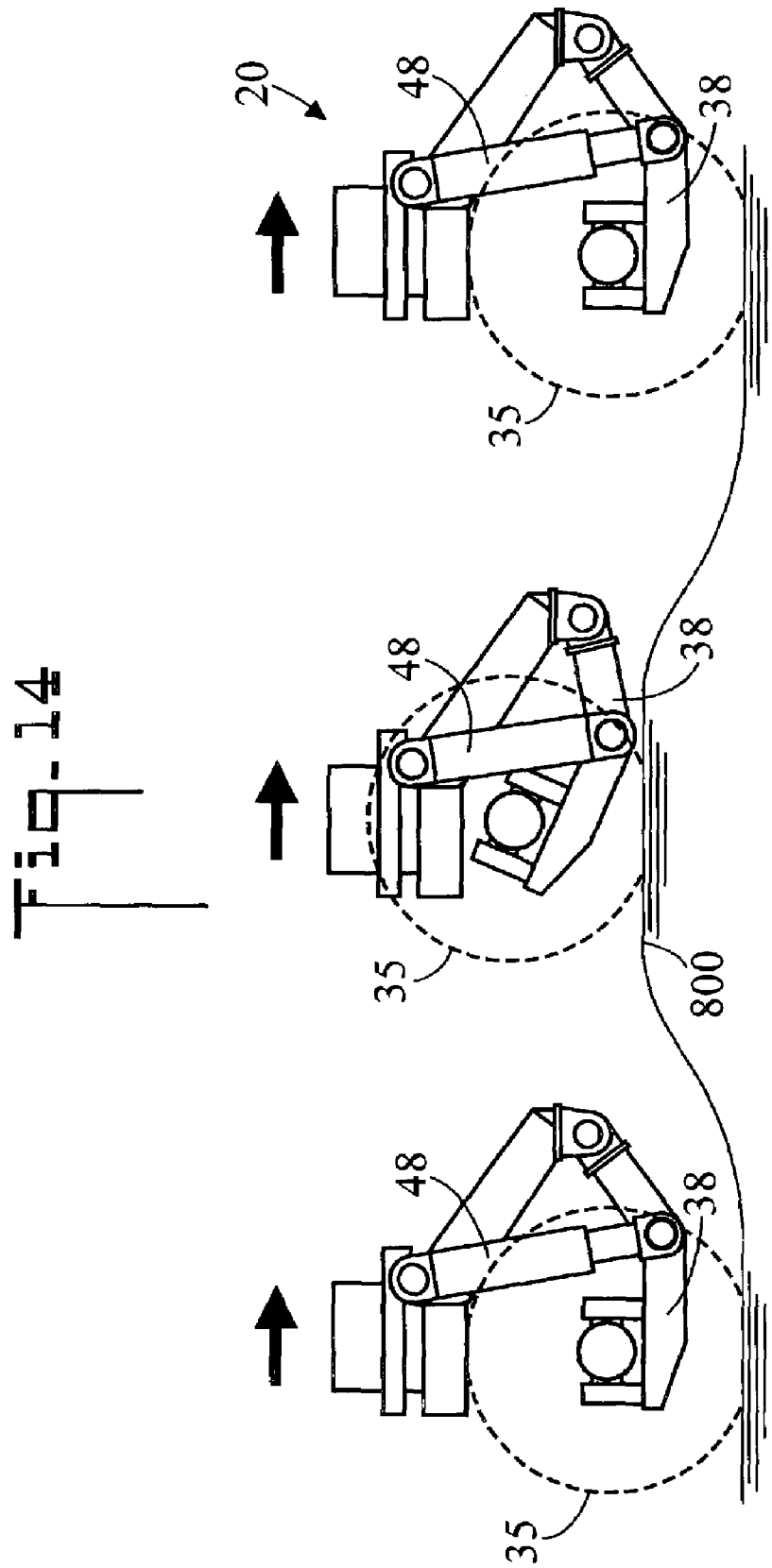
FIG. 14 is a side elevation view of the suspension system when the tires encounter a bump.

FIG. 14 is another side elevation view of suspension system 20 traveling along a road. When the tires 35 encounter a bump 800, suspension system 20 again automatically cushions the ride of the transport vehicle. In this case, the suspension retracts from a mid-stroke position on the left to a retracted position in the middle and returns to the mid-stroke position on the right.

FIG. 15 is a simplified bottom plan view of the prior art axle linkage member 604 of FIGS. 3 and 4 which is pivotally connected to axle 608. Since axle linkage member 604 is only connected to body 602 at one point 605, forces experienced during driving such as by turning, driving on an incline, going over bumps, going over potholes, etc. can cause axle linkage member 604 and axle 608 to yaw or rotate horizontally as indicated by the dotted lines so that the axle 608 is no longer perpendicular to the direction of travel. This condition can cause unwanted mechanical stresses and/or vibration particularly at higher speeds.

FIG. 16 is a simplified bottom plan view of axle linkage member 38 of the present invention. In suspension system 20, axle linkage member 38 is not just connected to body 22 at one location (see FIGS. 5–7). Rather, axle linkage member 38 has four attachment stations to body 22: left cylinder 48, attachment stations 28/42, attachment stations 26/40, and right cylinder 48. As a result of the four attachment stations, axle linkage member 38 is rigidly locked in place with respect to body 22 and will therefore resist the tendency to yaw. Axle 34 is therefore always substantially perpendicular to the direction of travel. In other words, when the transport vehicle is traveling on a road, connection of first attachment station 26 to third attachment station 40, connection of second attachment station 28 to fourth attachment station 42, and connection of two fluid activated cylinders 48 between body 22 and axle linkage member 38 combine to reduce the yaw of axle 34.

The preferred embodiments of the invention described herein are exemplary and numerous modifications, variations, and rearrangements can be readily envisioned to achieve an equivalent result, all of which are intended to be embraced within the scope of the appended claims.

I claim:

1. A suspension system for a transport vehicle, comprising:

a body pivotable about a first axis, said body having a first attachment station spaced apart from a second attachment station;

an axle disposable along a second axis perpendicular to said first axis;

an axle linkage member having a third attachment station spaced apart from a fourth attachment station, said third attachment station of said axle linkage member pivotally connected to said first attachment station of said body, and said fourth attachment station of said axle linkage member pivotally connected to said second attachment station of said body, said axle linkage member pivotable about a third axis parallel to said second axis;

said axle pivotally connected to said axle linkage member, said axle pivotable about a fourth axis perpendicular to said first, second and third axes;

two spaced apart fluid activated cylinders pivotally connected between said body and said axle linkage member, wherein said two fluid activated cylinders are disposed outside of said first, second, third, and fourth attachment stations; and, wherein when said two fluid activated cylinders are extended, said axle linkage member pivots away from said body, and when said two fluid activated cylinders are retracted, said axle linkage member pivots toward said body.

2. A suspension system according to claim 1, further including:

when the transport vehicle is traveling on a road, said connection of said first attachment station to said third attachment station, said connection of said second attachment station to said fourth attachment station, and said connection of said two fluid activated cylinders between said body and said axle linkage member reduce yaw of said axle.

* * * * *